(12) United States Patent
Nielsen et al.

(10) Patent No.: US 9,074,152 B2
(45) Date of Patent: Jul. 7, 2015

(54) PLASMA-ASSISTED WASTE GASIFICATION SYSTEM

(75) Inventors: Matthew Christian Nielsen, Scotia, NY (US); Richard Anthony DePuy, Burnt Hills, NY (US); Aditya Kumar, Schenectady, NY (US); James Patrick Francis Lyons, Saratoga Springs, NY (US); Vitali Lissianski, San Juan Capo, CA (US); Ruijie Shi, Clifton Park, NY (US); Surinder Prabhjot Singh, Tustin, CA (US); Kenneth Brakeley Welles, Scotia, NY (US); Vladimir Zamansky, Oceanside, CA (US)

(73) Assignee: General Electric Company, Niskayuna, NY (US)

(*) Notice: Subject to any disclaimer, the term of this patent is extended or adjusted under 35 U.S.C. 154(b) by 1658 days.

(21) Appl. No.: 12/209,011

(22) Filed: Sep. 11, 2008

(65) Prior Publication Data

US 2009/0064581 A1    Mar. 12, 2009

Related U.S. Application Data

(60) Provisional application No. 60/971,609, filed on Sep. 12, 2007.

(51) Int. Cl.
*B23K 10/00* (2006.01)
*C10J 3/86* (2006.01)
(Continued)

(52) U.S. Cl.
CPC .... *C10J 3/86* (2013.01); *C10J 3/18* (2013.01); *C10J 3/20* (2013.01); *C10J 3/84* (2013.01); *C10J 2200/158* (2013.01); *C10J 2300/0903* (2013.01); *C10J 2300/0946* (2013.01); *C10J 2300/0956* (2013.01); *C10J 2300/0959* (2013.01); *C10J 2300/0969* (2013.01);

(Continued)

(58) Field of Classification Search
CPC .................. H05H 1/28; H05H 1/48
USPC ............. 219/121.36, 121.52, 121.59, 121.48, 219/121.37, 121.38, 75; 110/246, 345, 346, 110/347, 203; 373/18–22
See application file for complete search history.

(56) References Cited

U.S. PATENT DOCUMENTS 5,280,757 A * 1/1994 Carter et al. .................. 110/346
5,311,830 A   5/1994 Kiss
(Continued)

FOREIGN PATENT DOCUMENTS

WO    2006081661    8/2006

*Primary Examiner* — Mark Paschall
(74) *Attorney, Agent, or Firm* — Francis T. Coppa

(57) ABSTRACT

A plasma-assisted waste gasification system and process for converting waste stream reaction residues into a clean synthesis gas (syngas) is disclosed. The feedstock is fed into a reactor roughly one-third from the bottom through the use of a feed mechanism. The reactor has three zones; a bottom zone where melting occurs, a middle zone where gasification takes place, and a top zone with integrated plasma torches to control the temperature and polish the syngas. The residence times in the three zones are selected to optimize the syngas composition and melted products. The syngas leaves the reactor and is partially quenched with relatively cooler synthesis gas. The partially quenched syngas is further cooled to recover heat for steam generation and/or preheating the waste stream to the reactor. The cold syngas is then processed to remove pollutants. The clean synthesis gas is combusted in power generation equipment to generate electricity, or converted to other fuels by chemical processes.

41 Claims, 2 Drawing Sheets

(51) Int. Cl.
*C10J 3/18* (2006.01)
*C10J 3/20* (2006.01)
*C10J 3/84* (2006.01)
*C10K 1/02* (2006.01)
*C10K 1/04* (2006.01)
*C10K 1/10* (2006.01)

(52) U.S. Cl.
CPC . *C10J 2300/0973* (2013.01); *C10J 2300/1238* (2013.01); *C10J 2300/1671* (2013.01); *C10J 2300/169* (2013.01); *C10J 2300/1884* (2013.01); *C10K 1/026* (2013.01); *C10K 1/04* (2013.01); *C10K 1/101* (2013.01); *Y02E 20/16* (2013.01)

(56) References Cited

U.S. PATENT DOCUMENTS

| | | | | |
|---|---|---|---|---|
| 5,809,911 | A | * | 9/1998 | Feizollahi ............... 110/346 |
| 5,958,264 | A | * | 9/1999 | Tsantrizos et al. ....... 219/121.38 |
| 6,810,821 | B2 | | 11/2004 | Chan |
| 6,971,323 | B2 | | 12/2005 | Capote et al. |
| 6,987,792 | B2 | | 1/2006 | Do et al. |
| 7,216,593 | B2 | | 5/2007 | Capote et al. |
| 7,249,564 | B2 | | 7/2007 | Lissianski et al. |
| 7,752,983 | B2 | * | 7/2010 | Vera ............... 110/250 |
| 2008/0041829 | A1 | * | 2/2008 | Blutke et al. ............. 219/121.36 |
| 2010/0139534 | A1 | * | 6/2010 | Tsantrizos ............... 110/204 |

* cited by examiner

PLASMA-ASSISTED WASTE GASIFICATION SYSTEM

This application claims the benefit of U.S. Provisional Application No. 60/971,609, filed Sep. 12, 2007.

BACKGROUND

Municipal waste is globally a growing problem. Landfills generate methane that is a green house gas concern. In addition, the tipping fees for landfills are increasing due to land constraints or governmentally mandated closures, which are in place in multiple countries, particularly in Asia and in the European Union, or will be in the near future. Incineration can be used, but this is not a good option for the future due to environmental concerns.

Gasification is a process that converts carbonaceous materials, such as coal, petroleum, or biomass, into gases, such as carbon monoxide and hydrogen, by reacting the raw material at high temperatures with a controlled amount of oxygen. The resulting gas mixture is called synthesis gas or "syngas" and is itself a fuel. Gasification is a very efficient method for extracting energy from many different types of organic materials, and also has applications as a clean waste disposal technique.

Generally, the gasification process consists of feeding carbon-containing materials into a heated chamber (the gasifier) along with a controlled and limited amount of oxygen and steam. At the high operating temperatures created by conditions in the gasifier, chemical bonds are broken by thermal energy and by partial oxidation, and inorganic mineral matter is fused or vitrified to form a molten glass-like substance called slag or vitreous frit. With insufficient oxygen, oxidation is limited and the thermodynamics and chemical equilibrium of the system shift reactions and vapor species to a reduced, rather than an oxidized state. Consequently, the elements commonly found in fuels and other organic materials end up in the syngas.

The advantage of gasification is that using the syngas in a gas turbine or reciprocating engine can give a higher overall thermal efficiency (combined cycle) than direct combustion in a boiler configuration producing thermal energy with conversion in a steam turbine (simple cycle). As mentioned, syngas may be burned directly in an internal combustion engines or gas turbines, or converted via the Fischer-Tropsch process into synthetic fuel. Gasification can also begin with materials that are not otherwise useful fuels, such as biomass or organic waste. In addition, it is possible to separate out corrosive or harmful emissions post gasification but prior to combustion. This produces a very clean syngas resembling natural gas. In the traditional direct combustion methods, such as incineration, the flue gases have to be cleaned post combustion often resulting in poor emission results and high cost.

Gasification of fossil fuels is currently widely used on industrial scales to generate electricity. However, almost any type of organic material can be used as the raw material for gasification, such as wood, biomass, or even plastic waste. Thus, gasification may be an important technology for renewable energy. In particular biomass gasification is carbon neutral.

Waste gasification technology has been developing for the past 20+ years. In fact, there are about 80 plants now operating or under construction in Japan, which will utilize some form of gasification technology. Most gasifiers operate at near atmospheric pressure and require some energy in addition to the energy contained in the waste stream. Many gasifiers use coke, coal, natural gas or plasma arc torch to provide the additional energy.

Utilizing a plasma arc torch to gasify a material is a technology that has been used commercially for many years. In all current designs, the plasma arc torch is placed towards the bottom of the plasma arc reactor with the plasma plume focusing on the slag or bed. Most plasma arc reactors produce a high quality syngas that can be used as a building block for other chemical manufacturing processes or as a fuel for energy production. Many feeds containing hydrocarbons, such as oil, coal, refinery residuals, and sewage sludge have all been successfully used in gasification operations. It is sometimes desirable to convert a hazardous stream of material into a useable product by gasifying the material. Upon gasification, the hazardous material, or feed, will typically be converted into a useable syngas and a useful molten material, or a molten glass-like substance called slag or vitreous frit. Because the slag is in a fused, vitrified state, it is usually found to be non-hazardous and may be disposed of in a landfill as a non-hazardous material, or sold as an ore, road-bed, or other construction material. It is becoming less desirable to dispose of waste material by incineration because of relatively low combustion efficiency, the heavy pollution and the further waste of disposing, as a residual waste, material that can be converted into a useful syngas and solid material.

The gasification system can be designed for a variety of feedstock, including waste. Once the gasifier is designed, however, varying fuel composition may present operational problems because of difficulty maintaining proper oxygen balance as the fuel composition changes. This is especially true for untreated municipal waste, where the composition can drastically change depending on the location from where waste is collected.

Therefore, a new technology is needed that can provide a cost effective and environmentally sound process to destroy municipal and industrial waste. This invention describes the design of a new gasifier and gasification system that can help solve this global problem.

BRIEF DESCRIPTION

Briefly, a plasma-assisted waste gasification system for converting a waste stream into a synthesis gas comprises a reactor having three zones; a bottom zone for melting the waste stream reaction residues and forming a slag pool, a middle zone for converting the waste stream into the synthesis gas, and a top zone having at least one plasma arc torch for controlling a temperature of the synthesis gas and composition (quality) of the synthesis gas; and a feed mechanism for introducing the waste stream into the reactor.

In another aspect of the invention, a reactor for a plasma-assisted waste gasification system comprises a bottom zone for melting a waste stream reaction residues and forming a slag pool; a middle zone for converting the waste stream into the synthesis gas; and a top zone having at least one plasma arc torch for controlling a temperature and composition of the synthesis gas.

In yet another aspect of the invention, a method for converting a waste stream into a synthesis gas in a plasma-assisted waste gasification system, the method comprising the steps of:

introducing a waste stream into a reactor;

melting the waste stream reaction residues and forming a slag pool in a bottom zone of the reactor;

converting the waste stream into the synthesis gas in a middle zone of the reactor; and controlling a temperature and composition of the synthesis gas in a top zone of the reactor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
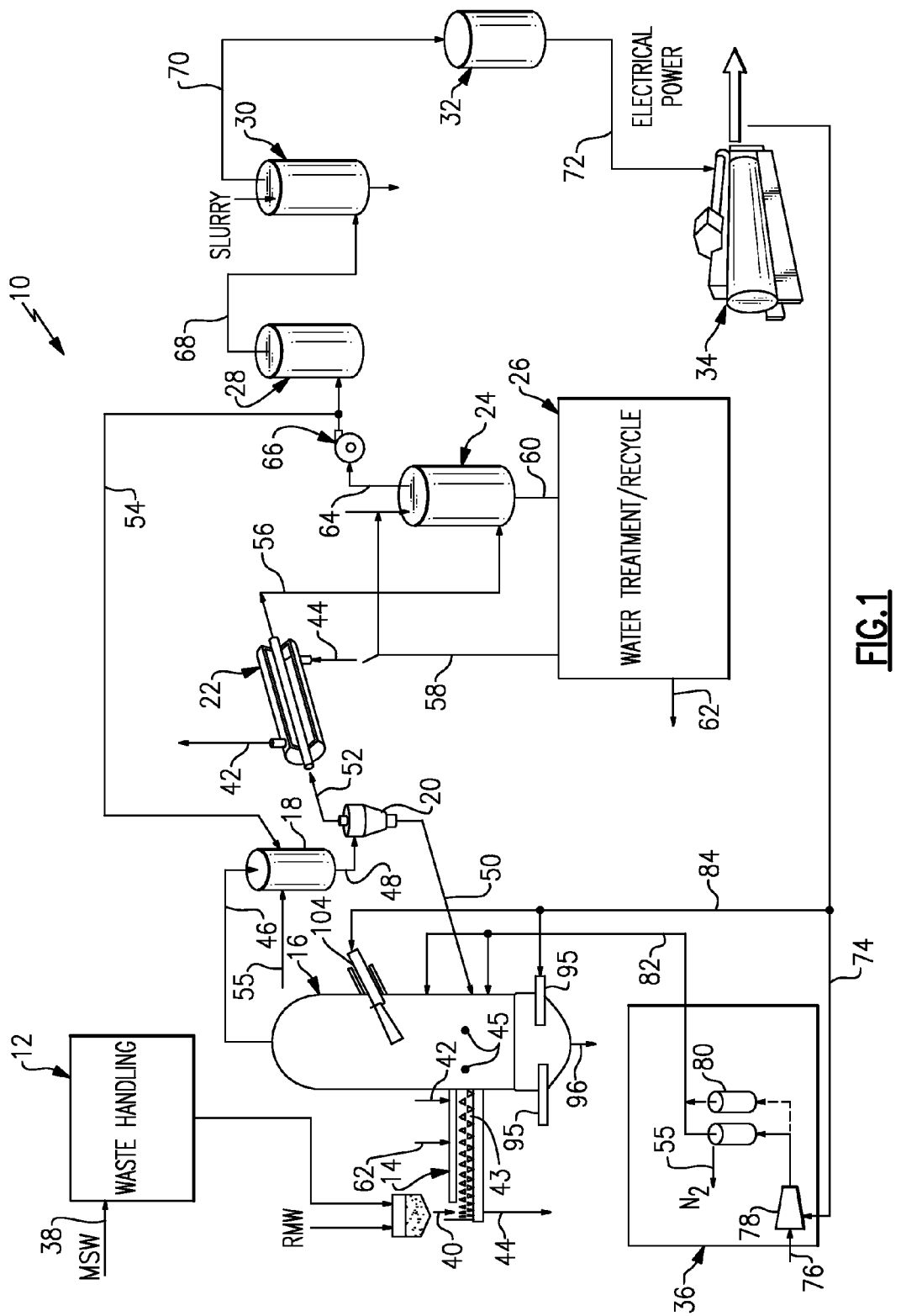
FIG. 1 is a schematic representation of a plasma-assisted gasification system according to an embodiment of the invention.

Referring to the drawings wherein identical reference numerals denote the same elements throughout the various views, FIG. 1 illustrates a schematic diagram of an exemplary plasma-assisted waste gasification system, shown generally at 10, for converting a waste stream into a synthesis gas (syngas). In general, the system 10 includes, but is not limited to, a waste handling facility 12, a pre-heater unit 14, a gasification reactor (gasifier) 16, a gas quench 18, a cyclone 20, a heat recovery unit 22, a scrubber 24, a water treatment/recycle unit 26, a mercury removal unit 28, a sulfur removal unit 30, a surge/buffer vessel 32, an electrical power generation equipment 34, and an air separation unit (ASU) 36.

Municipal solid waste (MSW) 38 enters the waste handling facility 12 for recycling, screening and/or shredding of the MSW 38. The MSW 38 may include, for example, plastics, tires, wet organic waste, and the like. The waste handling facility 12 produces a waste stream 40 in the form of refuse derived fuel (RDF) that may include biosolids, recycled municipal waste (RMW), and the like. However, the waste stream 40 may not need to be processed by the waste handling facility 12. For example, the waste stream 40 may comprise liquid waste (FIG. 2), a biomass, a biosolid, and the like. The waste stream 40 may contain up to about 50% conventional fuel, such as coal, and the like. Because the gasification reactor 16 of the invention has three zones and plasma torches, the waste stream 40 for the reactor 16 can be extremely flexible in composition and may comprises a variety of materials, such as organic material, inorganic material, and the like, that can be blended. In fact, in operation, one may want to blend different materials to optimize the performance of the gasification system 10.

The waste stream 40 is preheated by the pre-heater unit 14 using a fluid, such as hot oil, and the like, through line 42. Preheating of the waste stream 40 results in partial or complete devolatilization of the waste stream 40. In an embodiment, the hot oil is introduced into the pre-heater unit 14 at a temperature of in a range of about 200° C. to about 350° C., depending on the various factors, such as a vaporization temperature of the oil. The hot oil is heated by the heat recovered from the syngas by the heat recovery unit 22. The relatively cooler oil from the pre-heater unit 14 is recycled back to the heat recovery unit 22 through line 44 to increase overall thermal efficiency of the system 10.

The waste stream 40 is fed into the reactor 16 roughly one-third from the bottom of the reactor 16 through the use of one or more feed mechanisms 43, such as a screw feed mechanism, and the like. Multiple feed mechanisms 43 provide redundancy in the case of a failure of a feed mechanism, and allows for replacement of the defective feed mechanism during operation of the gasification system 10. It may be desirable that the one or more feed mechanisms 43 feed the material through multiple ports 45 to provide improved distribution and subsequent reaction of the feed material inside the reactor 16. In some embodiments, the use of a twin screw feed mechanism is preferred because it is inherently air tight and can be used without an airlock for the feeding of fluid or granulated solid stock into a pressurized vessel. In a single screw feed, if the feedstock is loose, then there exists a continuous air path from one end to the other of the feed screw. Pressure from a vessel can escape through this air path. In a twin screw feed mechanism, each single pitch of the screw forms a sealed chamber within the threads of the two feed screws. This prevents pressure from escaping from the vessel being fed. Moreover, in some embodiments, the use of a plunger feed mechanism may be advantageous.

The reactor 16 produces hot syngas at a high temperature, for example, about 1600° C. Details of the reactor 16 will be discussed below. The hot syngas from the reactor 16 enters the gas quench 18 through line 47 that cools the hot syngas to a relatively cooler temperature, for example, about 800° C. The relatively cooler syngas from the gas quench 18 enters the cyclone 20 through line 48, which separates the particulates from the cooler syngas. The particulates from the cyclone 20 return to the feed mechanism 14 of the reactor 16 through line 50, and the relatively cooler syngas with the particulates removed enters the heat recovery unit 22 through line 52. The gas quench 18 cools the hot syngas by using cold syngas at a low temperature, for example, about 50° C. that has been recycled from the scrubber 24 through line 54. Alternative heat exchange fluids, such as natural gas, $N_2$, and the like, can be used to quench the hot syngas upon startup of the gasification system 10 when there is insufficient cool syngas available from the scrubber 24 through line 54.

During startup, the cold syngas from the scrubber 24 to the gas quench 18 through line 54 may not be available. However, the hot syngas from the reactor 16 needs to be cooled to prevent possible damage to downstream components. To solve this problem, the hot syngas from the reactor 16 that enters the gas quench 18 can be cooled by relatively cooler fluid, such as $N_2$, natural gas, and the like, to the gas quench 18 through line 55. For example, the relatively cooler fluid may be provided from the ASU 36, a storage tank, and the like. Once the system 10 reaches steady state operation, the hot syngas entering the gas quench 18 can be cooled in the normal manner using the relatively cooler syngas through line 54.

The syngas exits the heat recovery unit 22 at a relatively low temperature, for example, about 110° C. through line 56 and enters the scrubber 24. The scrubber 24 cools the syngas to a low temperature, for example about 50° C. using water through line 58 from the water treatment/recycle unit 26. The water that exits the scrubber 24 through line 60 is recycled back to the water treatment/recycle unit 26. Any particulates (fines) in the water are removed by the water treatment/recycle unit 26 and returned to the feed mechanism 14 of the reactor 16 through line 62.

The syngas exits the scrubber 24 through line 64 and is pumped by a pump 66 into the mercury removal unit 28. The mercury removal unit 28 may contain a bed of active carbon (not shown) for removing mercury from the syngas. The mercury can be removed from the syngas using other means well-known in the art. The syngas exits the mercury removal unit 28 through line 68 and enters the sulfur removal unit 30, which removes the sulfur from the syngas using a catalyst slurry. The sulfur can be removed from the syngas using other means well-known in the art. The clean syngas exits the sulfur removal unit 30 through line 70 and enters the surge/buffer vessel 32. The clean syngas in the surge/buffer vessel 32 is then transferred through line 72 to the power generation equipment 34, such as a gas turbine, and the like, to produce electrical power. In addition, the clean syngas can be used for liquid fuel production.

In an embodiment, about 12.0 MWe gross is produced by the power generation equipment 34, and about 8.0 MWe net is exported after all the parasitic loads in the plant. The air separation unit 36 receives electrical power from the power generation equipment 34 through line 74. In an embodiment, the air separation unit 36 receives about 2.0 MWe from the power generation equipment 34. The reactor 16 also receives electrical power from the power generation equipment 34 through line 84. In an embodiment, the reactor 16 receives about 1.5. MWe from the power generation equipment 34.

The air separation unit 36 includes an air intake 76 for a compressor 78 that pressurizes the air to about 3 atmosphere pressure. The pressurized air is then fed through packed columns 80 that removes other gases from the air, such as $N_2$, and produces about 95% $O_2$ for introduction into the reactor 16 through line 82.

Figure 2:
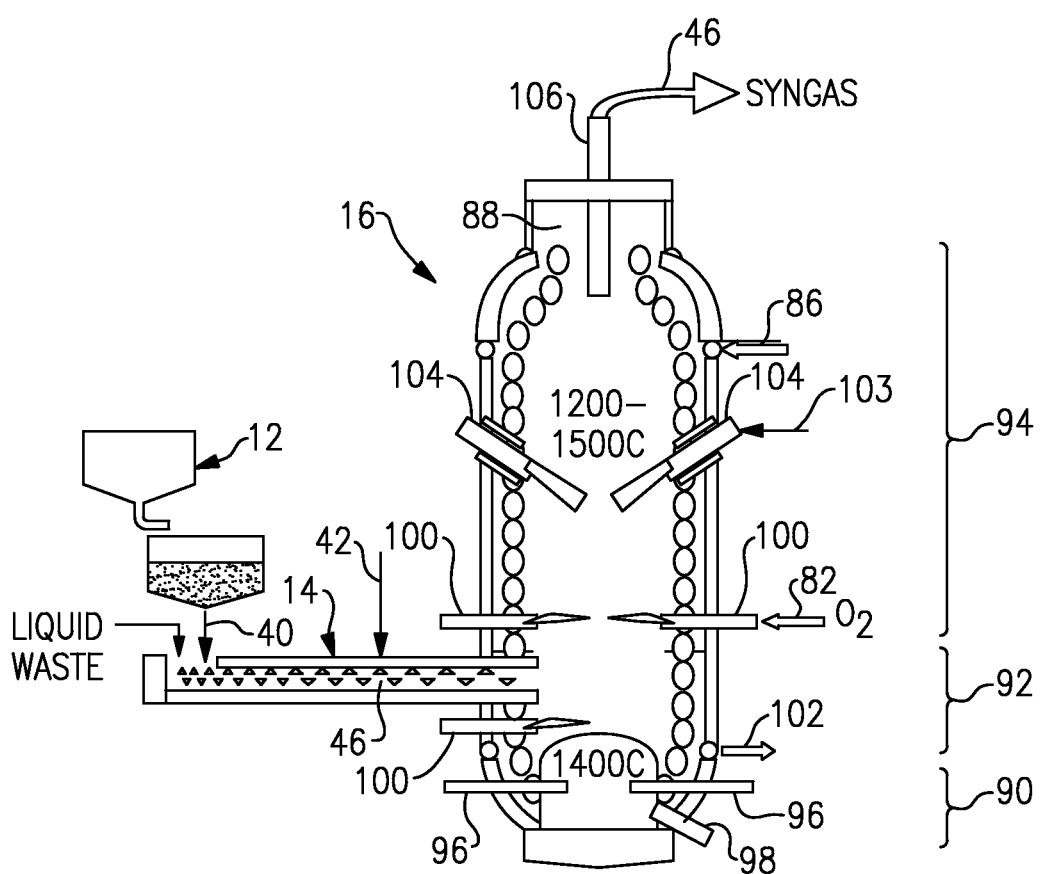
FIG. 2 is a schematic representation of a gasification reactor (gasifier) of the plasma-assisted gasification system of FIG. 1 according to an embodiment of the invention.

Referring now to FIG. 2, the gasification reactor (gasifier) 16 is constructed preferably of high-grade steel. Depending upon design criteria, the entire reactor 16 may be water-cooled through line 86. Alternatively, water-cooling may be used for only the top two thirds of the reactor 16, while the lower third of the reactor 16 is air-cooled. The reactor 16 has a refractory lining 88 throughout its inner shell. In one example, the upper two-thirds of the reactor 16 is lined with three layers of refractory material, with each layer about 4 to 6 inches thick, and the lower third of the reactor 16, which may not be water-cooled, is lined with up to five layers of refractory brick for a total thickness of about 20 to 30 inches. Depending upon the application other refractory configurations may be used. Both sections utilize typical commercial refractory products, which are known to those in the industry.

In one aspect of the invention, the reactor 16 is divided into three reacting zones; a bottom zone 90, a middle zone 92 and a top zone 94. In one embodiment, the reactor 16 is somewhat funnel shaped, which increases in cross-section from the bottom zone 90 to the top zone 94 of the reactor 16. The funnel-shape design reduces gas velocity, which increases the residence time inside the reactor and decreases the potential for entrainment of particulate matter. In an exemplary embodiment, the bottom zone 90 may contain up to about 25% of the total volume of the reactor 16, the middle zone 92 about 20% to about 60% of the total volume of the reactor 16, and the top zone 94 up to about 60% of the total volume of the reactor 16.

The bottom zone 90 of the reactor 16 is referred to as a melting zone, in which melting of the reaction residues of the waste stream 40 occurs and a slag pool forms with glass and metal layers. The bottom zone 90 includes one or more Joule/plasma heating devices 95 that can provide thermal energy to the melt to maintain the slag at a high temperature, for example, about 1400° C. The Joule/plasma heating devices 95 are provided with electrical energy from the power generation equipment 34 through line 84. The slag pool exits the reactor 16 through line 96, where the molten slag liquid is tapped continuously into a moving granulating water bath (not shown), cooled and vitrified into an inert slag material suitable for re-use as construction material, for example, tiles, roofing granules, bricks, and the like. The bottom zone 90, which contains the molten slag, may, in certain configurations, be attached to the reactor 16 by a flanged fitting (not shown) to enable rapid replacement of the bottom zone 90 in the event of refractory replacement or repairs.

The middle zone 92 of the reactor 16 is referred to as a gasification zone, in which organics are converted to synthesis gas (syngas). It should be appreciated that some portion of the gasification reactions may also occur in the bottom zone 90. The waste stream 40 is introduced into the middle zone 92 of the reactor 16. In the illustrated embodiment, the waste stream 40 enters through a single feed mechanism 43. However, the invention can be practiced using multiple feed mechanisms 43. The middle zone 92 may include a moving bed area (not shown) to increase the residence time of the waste stream 40 in the middle zone 92. The middle zone 92 has a circumference that is larger than the bottom zone 90, but smaller than the top zone 94. The middle zone 92 includes one or more heating devices 100, such as an oxygen lance, a plasma arc torch, and the like. The heating devices 100 are supplied with electrical power from the power generation equipment 34 through line 84 and provide thermal energy to gasify the remaining char in the liquid phase and to control the temperature of the middle zone 92. In one embodiment, the heating devices 100 are fed oxygen, oxygen-enriched air, steam or carbon dioxide (as pre-determined according to the waste composition), which is introduced into the reactor 16 through lines 82 from the air separation unit 36 to further assist in char gasification. The oxygen to fuel ratio is in a range of about 0.5 to about 1.5. The number of lines 82 may typically range from six to ten, depending on the size of the reactor 16 and the throughput of the gasification system 10, although a larger or smaller number of lines 82 may be used. The middle zone 92 includes an outlet line 102 for steam to exit the middle zone 92 and enter the top zone 94 of the reactor 16. The steam is a result of the heating of the water entering the reactor 16 through line 86.

The top zone 94 of the reactor 16 is referred to as plasma temperature controlled zone, in which the temperature of the top zone 94 is controlled and the synthesis gas (syngas) is polished. As used herein, polishing of the synthesis gas is defined as the complete conversion from hydrocarbons to synthesis gas and the destruction of toxic compounds. To this end, the top zone 94 includes one or more integrated heating devices 104, such as plasma arc torches that are supplied with electrical power from the power generation equipment 34 through line 84, and gas through line 103, which may include steam from line 102. In another embodiment, the heating devices 104 comprise plasma gas torches that are supplied with oxygen, oxygen enriched air, steam or carbon dioxide, similar to the heating devices 100 of the middle zone 92. The oxygen to fuel ratio is in a range of about 0.5 to about 1.5. In either embodiment, the plasma torches 104 can be controlled in real time by increasing or decreasing the electrical power supplied to the plasma torches 104 through line 84. By doing so, the overall temperature or energy flux into the reactor 16 and composition(s) of the syngas can be controlled, as compared to conventional reactors in which the plasma torches are focused on the slag at the bottom of the reactor.

Each plasma torch 104 may be mounted in a tuyere-like attachment (not shown), which is typically made of water-cooled copper, that are equally spaced around the circumference of the reactor 16. For example, the top zone 94 may include between one to six tuyere-like attachments equally spaced around the circumference of the reactor 16. The number of torches, the power rating of each torch, the capacity of the waste feeding system, the amount of carbon catalyst, the amount of flux, the size of the reactor, the size and capacity of the syngas cleaning system and the size of the combined cycle gas turbine system are all variables to be determined according to the type and volume of waste to be processed by the system.

In one embodiment, the synthesis gas (syngas) in the top zone 94 of the reactor 16 has a temperature of between about 1200 to about 1500° C. In the illustrated embodiment, the hot syngas 46 exits the reactor 16 through a single outlet 106 in the center of the top of the reactor 16. However, the invention can be practiced by providing a plurality of exit gas outlets 106 around the top of the reactor 16. As described above, the hot syngas from the reactor 16 enters the gas quench 18 through line 46 that cools the hot syngas to a temperature of about 800° C. The relatively cooler syngas from the gas quench 18 enters the cyclone 20 through line 48, which separates the particulates from the cooler syngas. The particulates from the cyclone 20 return to the feed mechanism 14 of the reactor 16 through line 50, and the relatively cooler syngas with the particulates removed enters the heat recovery unit 22 through line 52. The gas quench 18 cools the hot syngas by using cold syngas at a temperature of about 50° C. that has been recycled from the scrubber 24 through line 54. Alternative heat exchange fluids, such as natural gas, $N_2$, and the like, can be used to quench the hot syngas upon startup of the gasification system 10 when there is insufficient cool syngas available from the scrubber 24. The partially quenched syngas allows for the recovery of the heat from the heat recovery unit 22, which is used to generate steam and/or preheating the waste stream 40, thereby increasing the overall efficiency of the gasification system 10, as compared to conventional systems that use either an acid quench or a water quench at near-ambient temperature.

The reactor 16 contains sensors (not shown) to detect the pressure and temperature inside the reactor 16, as well as gas sampling ports and appropriate gas analysis equipment (not shown) at strategic positions in or just after the reactor 16 to monitor the gasification process. The use of such sensors and gas analysis equipment is well understood in the art. The measurements from the sensors and gas analysis equipment can be used to optimize the temperature and residence times in the three zones 90, 92, 94 of the reactor 16 for effective synthesis gas and melted products formation.

As described above, the incorporation of plasma torches in the top zone 94 of the reactor 16 helps to ensure that all long chain hydrocarbons, tars and toxic compounds are decomposed in an energy efficient polishing operation. The overall system efficiency of the gasification system 10 for converting the incoming waste stream 40 into electrical energy is higher than that reported from conventional gasification systems. Preliminary calculations show an efficiency of the gasification system 10 on the order of about 25%, as compared to about 10-15% for conventional gasification systems, thereby increasing revenues and/or other products.

Steam or carbon dioxide and their blends with oxygen/air can be used in the middle zone 92 or the top zone 94. Typically, steam and carbon dioxide gasification proceeds much slower than that of oxygen. However, gasification in the zone 94 may proceed relatively fast with steam or $CO_2$ with little or no oxygen present since gasification in this zone is limited to reactions of gas-phase species. This reduces oxygen requirements in the third reactor, reduces the potential for dioxins formation and reduces the potential of oxygen slip into syngas when composition of waste fuels suddenly changes. The example below illustrates benefits of oxygen replacement with steam in the top zone 94.

A process model was developed to support the concept that utilization of steam instead of air in the third reactor does not change significantly the time required for the gasification of gas-phase components created by devolatilization. Process modeling helps to understand the effect of system components and conditions. In modeling, a set of homogeneous reactions representing the interaction of reactive species was assembled. Each reaction was assigned a certain rate constant and heat release or heat loss parameters. Numerical solution of differential equations for time-dependent concentrations of the reagents made it possible to predict the concentration-time curves for all reacting species under selected process conditions. Using the modeling revealed the process conditions required for strong improvements in the gasification process.

The kinetic mechanism (Maurice, L. Q. (1996) *Ph.D. Thesis*, University of London) used to compare gasification times in the presence of air and steam included 1,156 reactions of 187 C—H—O—N gas phase species. The mechanism included hydrocarbon species up to $C_8H_{18}$.

The chemical kinetic code ODF (Kau, C. J., Heap, M. P., Seeker, W. R., and Tyson, T. J., Fundamental Combustion Research Applied to Pollution Formation. *U.S. Environmental Protection Agency Report No. EPA*-6000/7-87-027, *Volume IV: Engineering Analysis*, 1987.), for "One Dimensional Flame" was employed to model experimental data. The ODF treats a system as a series of one-dimensional reactors. Each reactor may be perfectly mixed (well-stirred) or unmixed (plug-flow). Each ODF reactor may be assigned a variety of thermodynamic characteristics, including adiabatic, isothermal, or specified profiles of temperature or heat flux, and/or pressure. Process streams may be added over any interval of the plug flow reactor, with arbitrary mixing profiles along the reactor length. The flexibility in model setup allows for many different chemical processes to be simulated under a wide variety of mixing conditions.

The gasification process was treated as a plug-flow reactor assuming that all components were premixed. Two cases were considered: $C_8H_{18}$ gasification in the presence of air and steam. In the first case oxygen from air served as gasification agent:

$$C_8H_{18} + 4O_2 \rightarrow 8CO + 9H_2O. \tag{1}$$

In the second case, $C_8H_{18}$ was gasified by steam according to following equation:

$$C_8H_{18} + 8H_2O \rightarrow 8CO + 17H_2. \tag{2}$$

The modeling was done at a constant temperature of about 2550° F. and a pressure of about 1 atm. The theoretical yield was calculated assuming complete conversion of $C_8H_{18}$ to CO and $H_2$ according to Equation (1) for oxygen gasification and according to Equation (2) for steam gasification. The modeling indicated that, although air gasification occurs faster than steam within first 100 ms of the process, 90% gasification occurs within less than about 1 second for air and steam gasification. Because in practical gasification systems with vessel dimensions of several feet, the mixing time of devolatilization products with the gasifying agent (oxygen or steam) are usually within range of several hundred milliseconds, the modeling shows that the progress of gasification of gas-phase devolatilization products is limited by mixing. Thus, replacement of air with steam in the top zone 94 does not change significantly the time required for the gasification of gas-phase components of the devolatilization.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A plasma-assisted waste gasification system for converting a waste stream into a synthesis gas, comprising:
a reactor having three zones; a bottom zone for melting the waste stream reaction residues and forming a slag pool, a middle zone higher in elevation than the bottom zone for converting the waste stream into the synthesis gas, and a top zone higher in elevation than both the bottom zone and the middle zone and having at least one plasma arc torch for controlling a temperature of the synthesis gas and composition of the synthesis gas; and
a feed mechanism for introducing the waste stream into the reactor.

2. A system according to claim 1, wherein the bottom zone of the reactor has a smaller cross-sectional area than the middle zone, and wherein the middle zone has a smaller cross-sectional area than the top zone.

3. A system according to claim 1, wherein the at least one plasma arc torch emits a heated process gas stream that is adjusted according to an amount of thermal energy to be introduced into the reactor.

4. A system according to claim 1, wherein the waste stream is introduced into the middle zone of the reactor.

5. A system according to claim 4, wherein the waste stream is preheated before being introduced into the middle zone of the reactor.

6. A system according to claim 1, wherein the waste stream reaction residue is melted in the bottom zone of the reactor by a joule heater or a plasma arc torch.

7. A system according to claim 1, further comprising a gas quench for partially cooling of the synthesis gas from the reactor by mixing with relatively cooler syngas from downstream of the gas quench.

8. A system according to claim 7, further comprising a heat exchanger located downstream of the gas quench for extracting thermal energy from the synthesis gas.

9. A system according to claim 8, wherein the waste stream is preheated before being introduced into the middle zone of the reactor by the thermal energy extracted from the heat exchanger.

10. A system according to claim 1, wherein the at least one plasma arc torch is controlled in real-time to control the temperature and composition of the synthesis gas in the top zone.

11. A system according to claim 1, further comprising a plurality of feed mechanisms.

12. A system according to claim 11, wherein one of the feed mechanisms is capable of being removed during system operation.

13. A system according to claim 1, wherein the waste stream is introduced into the reactor through multiple ports.

14. A system according to claim 1, wherein the feed mechanism comprises a screw feed mechanism.

15. A system according to claim 14, wherein the screw feed mechanism comprises a twin screw feed mechanism.

16. A system according to claim 1, wherein the feed mechanism comprises a plunge feed mechanism.

17. A system according to claim 1, further comprising an air separation unit for providing air, oxygen, oxygen enriched air, steam, and/or carbon dioxide to the reactor through multiple ports and used as gasification agents.

18. A system according to claim 17, wherein a ratio of oxygen to fuel is in a range between about 0.5 to about 1.5.

19. A system according to claim 1, wherein relatively cooler fluid is used to quench the synthesis gas from the reactor during startup conditions.

20. A system according to claim 1, further comprising a power generation unit, wherein the synthesis gas is used in the power generation unit to generate electrical power.

21. A reactor for a plasma-assisted waste gasification system, comprising:
a bottom zone for melting a waste stream reaction residues and forming a slag pool;
a middle zone higher in elevation than the bottom zone for converting the waste stream into the synthesis gas; and
a top zone higher in elevation than both the bottom zone and the middle zone and having at least one plasma arc torch for controlling a temperature and composition of the synthesis gas.

22. A reactor according to claim 21, wherein the bottom zone has a smaller cross-sectional area than the middle zone, and wherein the middle zone has a smaller cross-sectional area than the top zone.

23. A reactor according to claim 21, wherein the at least one plasma arc torch emits a heated process gas stream that is adjusted according to an amount of thermal energy to be introduced into the reactor.

24. A reactor according to claim 21, wherein the waste stream is introduced into the middle zone of the reactor.

25. A reactor according to claim 24, wherein the waste stream is preheated before being introduced into the middle zone of the reactor.

26. A reactor according to claim 21, further comprising a joule heater or a plasma arc torch for heating the waste stream in the bottom zone of the reactor.

27. A reactor according to claim 21, wherein the at least one plasma arc torch is controlled in real-time to control the temperature and composition of the synthesis gas in the top zone.

28. A reactor according to claim 21, wherein air, oxygen, oxygen enriched air, steam, and/or carbon dioxide are used as gasification agents.

29. A reactor according to claim 28, wherein a ratio of oxygen to fuel is in a range between about 0.5 to about 1.5.

30. A method for converting a waste stream into a synthesis gas in a plasma-assisted waste gasification system, the method comprising the steps of:
introducing a waste stream into a reactor;
melting the waste stream reaction residues and forming a slag pool in a bottom zone of the reactor;
converting the waste stream into the synthesis gas in a middle zone of the reactor, the middle zone higher in elevation than the bottom zone; and
controlling a temperature and composition of the synthesis gas in a top zone of the reactor, the top zone higher in elevation than both the bottom zone and the middle zone.

31. A method according to claim 30, wherein the temperature and composition of the synthesis gas is controlled in the top zone of the reactor by using at least one plasma arc torch.

32. A method according to claim 31, wherein the at least one plasma arc torch emits a heated process gas stream that is adjusted according to an amount of thermal energy to be introduced into the reactor.

33. A method according to claim 30, wherein the waste stream is introduced into the middle zone of the reactor.

34. A method according to claim 33, further comprising the step of preheating the waste stream before being introduced into the middle zone of the reactor.

35. A method according to claim 30, wherein the waste stream reaction residues are melted in the bottom zone of the reactor by using a joule heater or a plasma arc torch.

36. A method according to claim 30, further comprising the step of partially cooling the synthesis gas from the reactor using a gas quench.

37. A method according to claim 36, further comprising the step of extracting thermal energy from the synthesis gas downstream of the gas quench using a heat exchanger.

38. A method according to claim 37, wherein the waste stream is preheated before being introduced into the reactor by thermal energy extracted from the heat exchanger.

39. A method according to claim 30, wherein the temperature of the synthesis gas in the top zone of the reactor is controlled in real-time.

40. A method according to claim 30, further comprising the step of introducing oxygen, oxygen enriched air, steam, and/or carbon dioxide as a gasification agent into the reactor.

41. A method according to claim 40, wherein a ratio of oxygen to fuel is in a range between about 0.5 to about 1.5.

* * * * *